(12) United States Patent
Jacquet

(10) Patent No.: US 8,593,818 B2
(45) Date of Patent: Nov. 26, 2013

(54) NETWORK ON CHIP BUILDING BRICKS

(75) Inventor: Francois Jacquet, Froges (FR)

(73) Assignee: Kalray, Orsay (FR)

( * ) Notice: Subject to any disclaimer, the term of this patent is extended or adjusted under 35 U.S.C. 154(b) by 633 days.

(21) Appl. No.: 12/912,931

(22) Filed: Oct. 27, 2010

(65) Prior Publication Data

US 2011/0095816 A1    Apr. 28, 2011

(30) Foreign Application Priority Data

Oct. 28, 2009 (FR) .................................... 09 05184

(51) Int. Cl.
*H05K 1/00* (2006.01)

(52) U.S. Cl.
USPC ........... 361/748; 361/744; 716/121; 716/128; 438/14; 326/41; 365/51

(58) Field of Classification Search
USPC ............. 361/748, 744; 716/121, 128; 438/14; 326/41; 365/51
See application file for complete search history.

(56) References Cited

U.S. PATENT DOCUMENTS

| | | | | | |
|---|---|---|---|---|---|
| 5,301,089 | A | * | 4/1994 | Takashima ..................... | 361/744 |
| 5,640,327 | A | * | 6/1997 | Ting .............................. | 716/121 |
| 6,072,994 | A | * | 6/2000 | Phillips et al. .................. | 455/84 |
| 6,174,742 | B1 | * | 1/2001 | Sudhindranath et al. ....... | 438/14 |
| 6,292,018 | B1 | * | 9/2001 | Kean ............................. | 326/41 |
| 6,338,972 | B1 | * | 1/2002 | Sudhindranath et al. ....... | 438/14 |
| 6,985,142 | B1 | * | 1/2006 | Svensson et al. ............. | 345/211 |
| 8,023,303 | B2 | * | 9/2011 | Echigoya et al. ............... | 365/51 |
| 8,174,599 | B2 | * | 5/2012 | Kuroda et al. ................ | 348/301 |
| 2004/0139413 | A1 | * | 7/2004 | DeHon et al. .................... | 716/9 |
| 2006/0214683 | A1 | * | 9/2006 | DeHon ........................... | 326/41 |
| 2008/0218197 | A1 | * | 9/2008 | Lewis et al. ..................... | 326/10 |
| 2008/0288909 | A1 | * | 11/2008 | Leijten-Nowak ............... | 716/16 |
| 2009/0193379 | A1 | * | 7/2009 | McElvain et al. ............... | 716/12 |
| 2009/0307466 | A1 | * | 12/2009 | Barsness et al. ............. | 712/220 |
| 2010/0014339 | A1 | * | 1/2010 | Echigoya et al. ............... | 365/51 |
| 2010/0241881 | A1 | * | 9/2010 | Barsness et al. ............. | 713/320 |
| 2010/0241884 | A1 | * | 9/2010 | Barsness et al. ............. | 713/322 |
| 2010/0283505 | A1 | * | 11/2010 | Koch et al. ..................... | 326/41 |
| 2010/0312939 | A1 | * | 12/2010 | Jacquet .......................... | 710/305 |
| 2011/0055449 | A1 | * | 3/2011 | Koch et al. ..................... | 710/306 |

FOREIGN PATENT DOCUMENTS

EP   1 701 274 A1   9/2006

* cited by examiner

*Primary Examiner* — Xiaoliang Chen

(74) *Attorney, Agent, or Firm* — Oliff & Berridge, PLC

(57) ABSTRACT

The present invention relates to a Network on chip comprising a torus matrix of processing elements formed by a juxtaposition of bricks in rows and columns, each brick comprising a longitudinal extra-connection bus segment connecting two terminals situated on opposite transverse edges of the brick on a first axis; two longitudinal intra-connection bus segments connecting circuits of the brick to respective terminals situated on the opposite transverse edges on a second axis symmetrical to the first axis with respect to the center of the brick; a transverse extra-connection bus segment connecting two terminals situated on opposite longitudinal edges of the brick on a third axis; and two transverse intra-connection bus segments connecting circuits of the brick to respective terminals situated on the opposite longitudinal edges on a fourth axis symmetrical to the third axis with respect to the center of the brick. The bricks are oriented at 180° from one to the next in the direction of the columns and in the direction of the rows, and each brick comprises an even number of power supply conductor segments arranged symmetrically with respect to an axis of symmetry of the brick and connecting opposite edges of the brick.

3 Claims, 3 Drawing Sheets

NETWORK ON CHIP BUILDING BRICKS

BACKGROUND OF THE INVENTION

The invention relates to the design of a Network on Chip (NoC) comprising a matrix of processing elements, and more particularly to an elementary structure, or brick, enabling a network of any size to be designed rapidly.

STATE OF THE ART

FIG. 1 represents an example of a network on chip of matrix (or mesh) topology as described in European Patent EP1701274.

This network comprises a plurality of busses arranged in rows (horizontal busses Bh) and columns (vertical busses Bv). A router RTR is placed at each intersection between a horizontal bus and a vertical bus to make a point-to-point connection between each (horizontal and vertical) bus segment that reaches it. Each router RTR is further connected to a local resource RSC, such as a processor cluster, which can be a data producer or consumer This kind of network is designed to make any resource RSC communicate with any other resource. A communication can cross several routers which perform routing of the data to the final destination.

To limit the number of nodes a communication can cross, the network is preferably toroidal. As represented, the routers located on an edge of the matrix are looped back onto the routers located on the opposite edge of the matrix. This further enables the same router structure to be used at the edge as in the center.

FIG. 2 represents a folded torus matrix network wherein the lengths of the connections between nodes are optimized. The matrix is for example of 4×4 dimension.

Each resource associated with its router has been represented by a circle in bold line, and will hereafter be referred to as "processing element". The processing elements are connected in interleaved manner by rows and by columns, i.e. an element of rank n in a column or a row is connected to an element of rank n+2 (the peripheral elements not abiding by this rule for one of their connections).

With this configuration, all the connections between elements are of substantially the same length.

A network of the type of FIG. 2 can comprise a considerable number of physical interconnections which have to be placed on the integrated circuit layout diagram. The busses used for data exchange can reach a width in the order of 1024 conductors.

It is further desired to provide a range of circuits with different matrix sizes suitable for a range of different applications. In other words, it is desired that the place-and-route work performed for a given matrix size be reusable for matrixes of different sizes.

A conventional procedure for placing the interconnections in a regular matrix circuit is to provide interconnection routing channels between the matrix cells, whereas a limited number of conductors are routed above the cells, in particular the power supply lines using the upper metallization levels.

In order to avoid performing new customized routing work for each matrix size, it is left up to the design software to route the interconnections automatically in the routing channels. The routing channels need to be over-sized with respect to the interconnection density so that the software can manage to route all the interconnections with minimum manual intervention.

This procedure requires substantial silicon surface for the routing channels. Furthermore, even if routing of the interconnections can be performed automatically, the routing time may be significant and require manual checking and optimization.

SUMMARY OF THE INVENTION

There is thus a need for a solution reusable without time investment to perform the interconnections between processing elements of a matrix network on chip, whatever the size of the matrix.

It is further desirable that this procedure does not require a significant increase in silicon area.

To tend to satisfy these needs, a network on chip is provided, comprising a torus matrix of processing elements, the matrix being formed by a juxtaposition of identical bricks each integrating a processing element, and interconnection bus and power supply segments of the matrix. The bricks are oriented at 180° from one to the next in the direction of the columns and in the direction of the rows.

Each brick comprises a longitudinal extra-connection bus segment connecting two terminals situated on opposite transverse edges of the brick on a first axis; and two longitudinal intra-connection bus segments connecting circuits of the brick to respective terminals situated on the opposite transverse edges on a second axis symmetrical to the first axis with respect to the center of the brick. The brick further comprises a transverse extra-connection bus segment connecting two terminals situated on opposite longitudinal edges of the brick on a third axis; and two transverse intra-connection bus segments connecting circuits of the brick to respective terminals situated on the opposite longitudinal edges on a fourth axis symmetrical to the third axis with respect to the center of the brick.

BRIEF DESCRIPTION OF THE DRAWINGS

Other advantages and features will become more clearly apparent from the following description of exemplary non-restrictive embodiments of the invention, illustrated by the accompanying drawings, in which.

DESCRIPTION OF A PREFERRED EMBODIMENT OF THE INVENTION

Figure 3:
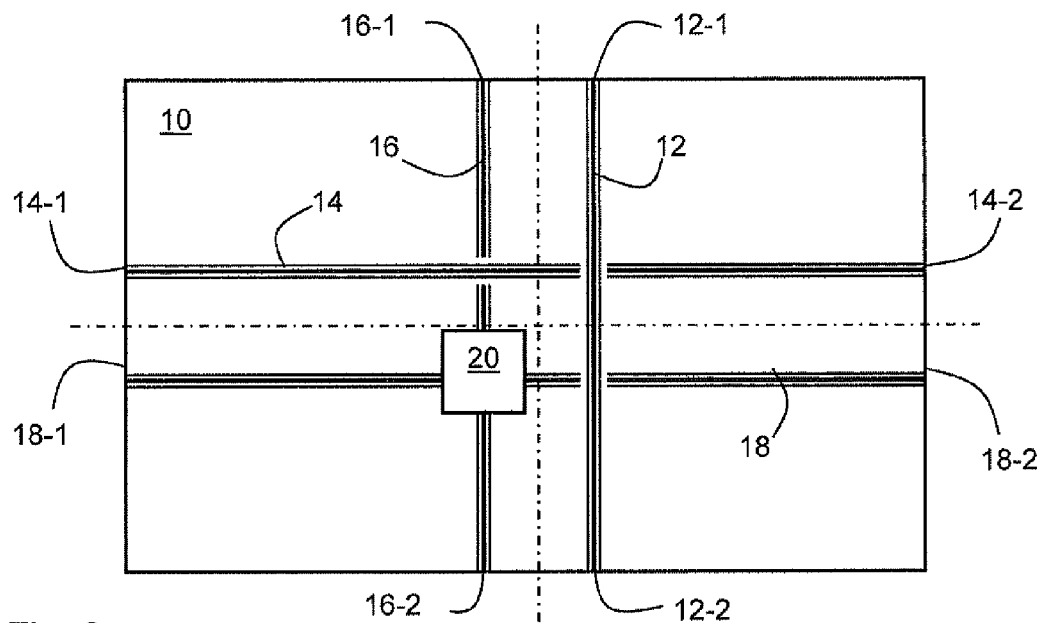
FIG. 3 schematically represents a layout embodiment of an elementary brick integrating a processing element of a toroidal matrix NoC.

FIG. 3 illustrates a layout embodiment of a matrix network processing element in the form of an elementary building brick 10. This building brick is similar for any processing element of the network matrix. In addition to the circuits (not shown) designed to perform the data processing and routing functions of the element, the brick integrates a set of conductor segments forming partial interconnections, serving the purpose of achieving all the interconnections between adjacent elements by simple juxtaposition and rotation of the bricks.

More precisely, brick 10, of rectangular shape, comprises a set of transverse conductor segments 12 connecting terminals 12-1 and 12-2 situated on the opposite longitudinal edges of the brick. A set of longitudinal conductor segments 14 connects terminals 14-1 and 14-2 situated on the opposite transverse edges of the brick.

The signals to be conveyed by the sets of conductor segments are preferably those that have to be exchanged between processing elements, in particular the interconnection bus signals. To simplify the language in the following, we will therefore refer to "bus segments" instead of "set of conductor segments".

Other less numerous signals, such as clock signals, reinitialization signals, and power voltages to be supplied to all the bricks, can be conveyed by conductors interconnected in another manner. An advantageous example of power supply line routing will be described in relation with FIG. 5.

Bus segments 12 are designed to transmit signals between two bricks situated transversely on either side of the shown brick. Similarly, bus segments 14 are designed to transmit signals between two bricks situated longitudinally on either side of the shown brick. These bus segments, which will be referred to as "extra-connection bus segments", therefore do not convey any signals for the brick itself, although the brick can be designed to intercept them if this is found to be of any use.

The brick further comprises two bus segments which will be referred to as "intra-connection bus segments", a transverse segment 16 and a longitudinal segment 18.

Transverse segment 16 is interrupted. It comprises two bus half-segments connecting two respective terminals 16-1 and 16-2 of the opposite longitudinal edges of the brick to distinct respective circuits 20 of the brick. Circuits 20 form, in particular, the router (RTR in FIG. 1) associated with the processing element of the brick. Similarly, longitudinal segment 18 is interrupted and comprises two bus half-segments connecting two respective terminals 18-1 and 18-2 of the opposite transverse edges of the brick to distinct respective circuits 20 of the router.

Intra-connection bus segments 16 and 18 are designed to transmit external signals to the brick itself by means of adjacent bricks.

Terminals 12-1 to 18-2 are arranged such that they contact corresponding terminals of adjacent bricks by juxtaposition, including when these bricks are oriented at 180° with respect to the shown brick. Terminals 12-1 and 12-2 are thus on an axis symmetrical to an axis comprising terminals 16-1 and 16-2, with respect to the center of the brick. Similarly, terminals 14-1 and 14-2 are on an axis symmetrical to an axis comprising terminals 18-1 and 18-2, with respect to the center of the brick.

As represented, the axes of segments 12 and 14 are parallel, as are the axes of segments 16 and 18.

According to an alternative (not shown) also meeting these requirements, the bus segments have symmetrical axes crossing at the center of the brick. This means that transverse segments 12 and 16 cross each other, and that longitudinal segments 14 and 18 cross each other. This alternative, although it is feasible, is not optimal, as it is preferable to limit the number of conductor crossings which increase the complexity of the routing.

Figure 4:
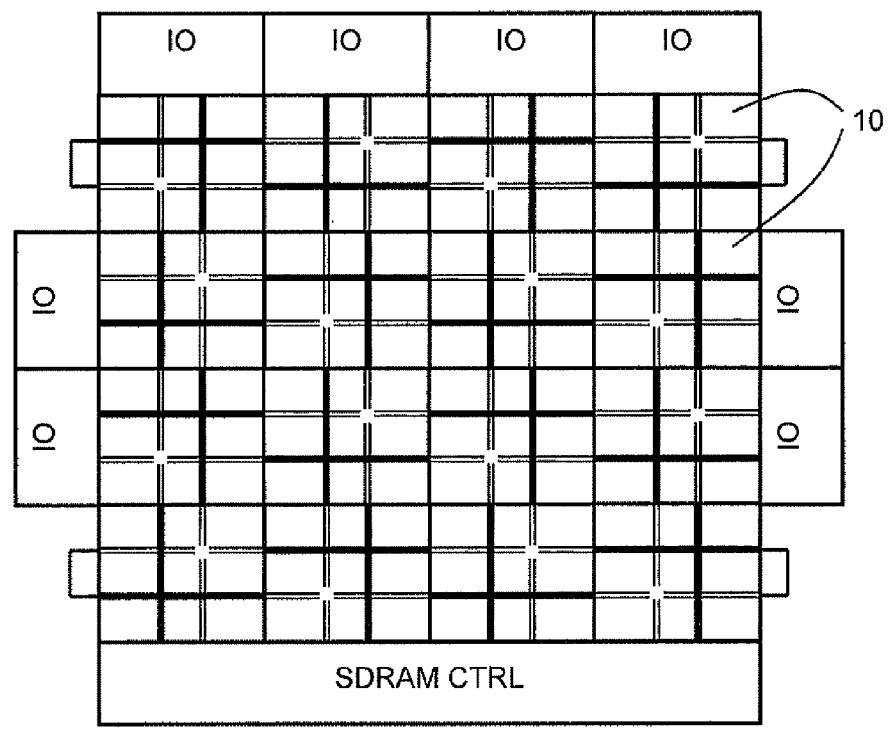
FIG. 4 represents an exemplary layout of a matrix NoC formed with bricks of the type of FIG. 3.

FIG. 4 represents an example of a NoC comprising a 4×4 matrix of processing elements made from bricks of the type of FIG. 3. In each brick, extra-connection bus segments 12 and 14 have been represented in bold lines and intra-connection bus segments 16 and 18 by double lines.

As shown, the bricks are juxtaposed in rows and columns. Two adjacent bricks, whether it be by column or by row, are preferably oriented at 180° from one another. The bus segments are interconnected via the edges of the bricks so that a brick of rank n is connected to a brick of rank n+2, above brick of rank n+1. The folded torus configuration of FIG. 2 is thus achieved.

Figure 1:
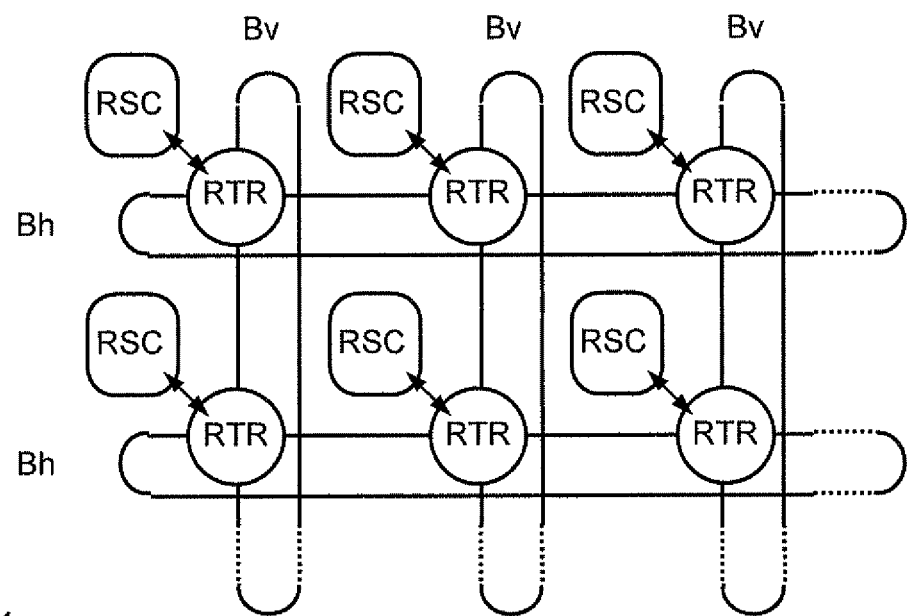
FIG. 1 schematically represents a conventional NoC of toroidal topology.

If the bricks were all arranged with the same orientation, the non-folded torus configuration of FIG. 1 would be achieved.

Figure 2:
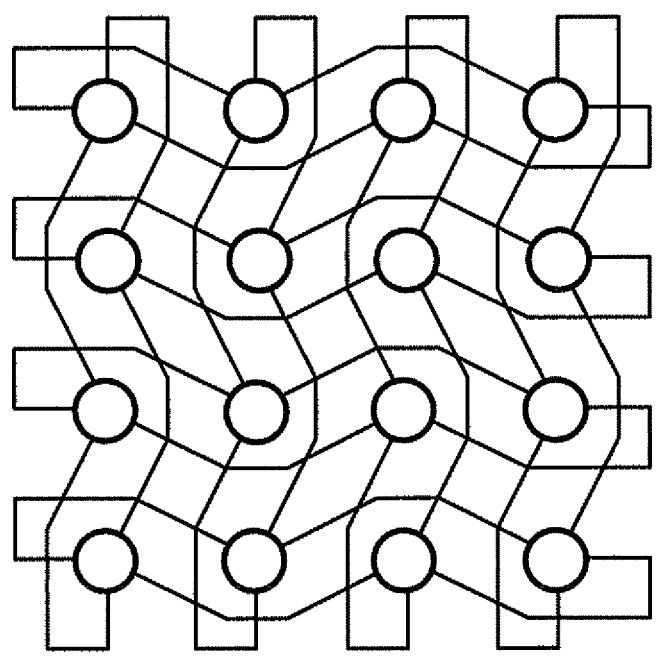
FIG. 2 represents an optimized toroidal NoC arrangement.

For exemplary purposes, in the first and last row of the matrix, the terminals situated on the edges of the matrix are looped back so that an edge brick is connected to the adjacent brick and to the brick one step beyond, in strict compliance with the structure of FIG. 2.

Other matrix edge bricks could be connected to peripheral elements, such as input/output circuits IO or an SDRAM memory interface circuit CTRL. Each of these peripheral elements is configured to ensure continuity of the torus, horizontally or vertically. Each peripheral element is thus connected to the two bus segments 12, 16 or 14, 18 of an edge brick of the matrix and comprises a router allowing data to be routed between each of the two bus segments and the peripheral element itself.

With the alternative embodiment of the bricks set out in the foregoing, where the extra-connection and intra-connection bus segments cross, a folded torus matrix according to FIG. 2 would be obtained using juxtaposed bricks having all the same orientation.

Figure 5:
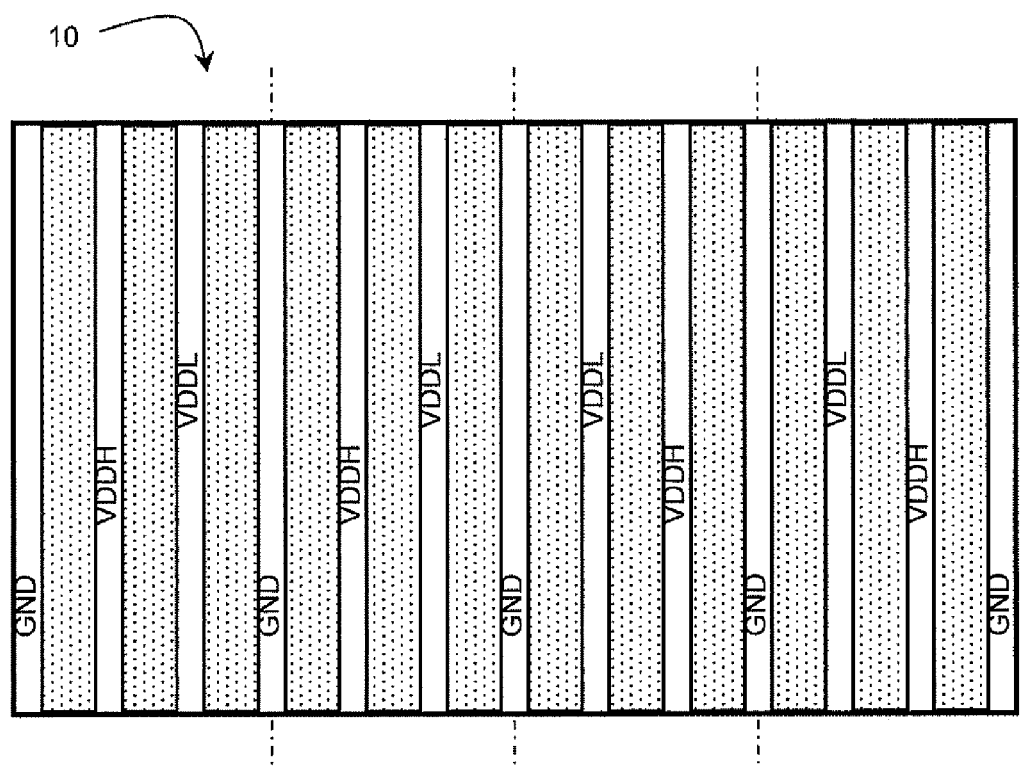
FIG. 5 represents an exemplary placement of power supply lines on a brick of the type of FIG. 3.

FIG. 5 represents an advantageous example of placement of power supply line segments on a brick of the type of FIG. 3, enabling routing of the power supply lines of the entire matrix by simple juxtaposition of the bricks. This placement of the power supply segments enables in particular adjacent bricks to be oriented at 180° with respect to one another.

In the shown example, a ground voltage GND and two power supply voltages VDDL and VDDH are to be supplied.

For each voltage, an even number of conductor segments are provided with parallel axes connecting two opposite edges of the brick. The segments are arranged symmetrically with respect to an axis of symmetry of the brick, here the vertical axis of symmetry. Preferably, as shown, the segments associated with the different voltages are interleaved and distributed uniformly over the brick. An additional segment can be provided in the center of the brick for one of the supply voltages, here ground voltage GND.

With this configuration, the power supply segments interconnect to form the power supply lines of the matrix by simple juxtaposition of the bricks along the axis of the segments. Moreover, the power supply lines are formed similarly regardless of the individual orientations of the bricks at 0° or 180°.

Other signals to be supplied to the processing elements, such as clock and reset signals, remain to be dealt with. As there is only a small number of these signals and they do not require conductors of large cross-section, they can be routed above the bricks in an automated manner. For the routing software not to be affected by the orientations of the bricks, each brick can be provided with two terminals for each signal, these two terminals being arranged symmetrically with respect to the center of the brick.

The invention claimed is:
1. Network on chip comprising a torus matrix of processing elements formed by a juxtaposition of bricks in rows and columns, each brick comprising:

a longitudinal extra-connection bus segment connecting two terminals situated on opposite transverse edges of the brick on a first axis;

two longitudinal intra-connection bus segments connecting circuits of the brick to respective terminals situated on the opposite transverse edges on a second axis symmetrical to the first axis with respect to the center of the brick;

a transverse extra-connection bus segment connecting two terminals situated on opposite longitudinal edges of the brick on a third axis; and two transverse intra-connection bus segments connecting circuits of the brick to respective terminals situated on the opposite longitudinal edges on a fourth axis symmetrical to the third axis with respect to the center of the brick;

wherein the bricks are oriented at 180° from one to the next in the direction of the columns and in the direction of the rows, and each brick comprises an even number of power supply conductor segments arranged symmetrically with respect to an axis of symmetry of the brick and connecting opposite edges of the brick.

2. Network on chip according to claim 1, wherein the extra-connection bus segments of each brick are not connected to circuits of the brick.

3. Network on chip according to claim 1, wherein the symmetrical axes with respect to the center of the brick are parallel.

\* \* \* \* \*